United States Patent [19]

Alexander

[11] Patent Number: 5,003,146
[45] Date of Patent: Mar. 26, 1991

[54] UNIVERSAL FITTING FOR METAL DISINTEGRATION ELECTRODES

[76] Inventor: Rayburn G. Alexander, 569 Hawthorne Ave., San Bruno, Calif. 94066

[21] Appl. No.: 400,513

[22] Filed: Aug. 28, 1989

[51] Int. Cl.$^5$ .............................. B23K 9/28; F16B 7/18
[52] U.S. Cl. ...................................... 219/69.1; 219/70; 279/20; 285/346; 403/295
[58] Field of Search .............. 403/373, 393, 296, 192, 403/295, 305, 308; 285/346, 348, 354, 369; 219/69.11, 69.14, 69.15, 69.2, 70, 69.1, 72; 279/1 R, 20

[56] References Cited

U.S. PATENT DOCUMENTS

| 3,443,819 | 5/1969 | Benjamin et al. | 279/20 |
| 3,486,775 | 12/1969 | Callahan, Jr. et al. | 285/348 |
| 3,583,714 | 6/1971 | Weltzer | 279/1 R |
| 3,986,730 | 10/1976 | Martelli et al. | 285/348 |
| 4,052,116 | 10/1977 | Sanders et al. | 219/70 |
| 4,268,740 | 5/1981 | Sanders | 219/70 |
| 4,396,317 | 8/1983 | Staron et al. | 279/20 |
| 4,538,043 | 8/1985 | Alexander | 219/69.15 |
| 4,717,803 | 1/1988 | Alexandersson | 219/69.15 |
| 4,789,769 | 12/1988 | Warner | 219/69.15 |
| 4,886,304 | 12/1989 | Kunsman | 285/348 |
| 4,893,846 | 1/1990 | McGraw | 285/369 |
| 4,918,278 | 4/1990 | Kuwabara et al. | 219/70 |

Primary Examiner—Geoffrey S. Evans
Attorney, Agent, or Firm—Janet K. Castaneda

[57] ABSTRACT

A universal fitting for electrodes for use with electric arc metal disintegrator apparatus. The fitting accommodates all sizes of electrodes used with metal disintegrator apparatus and enables electrodes as short as one inch to be used. The universal fitting connects two electrodes, such as two electrodes having different diameters and/or materials, respectively. Smaller diameter electrodes may be carried within larger diameter electrodes and only a short length of the smaller diameter electrode need be exposed to the workpiece. The universal fitting is composed of collets, a central double-ended connector for connecting a collet at each end, seals to form a water-tight connection between the collets and the double-ended connector, and retainers to secure the electrodes to the collets and the collets to the middle connector. The universal fitting may be axially aligned, or in another embodiment, form a right angle for offset work.

42 Claims, 4 Drawing Sheets

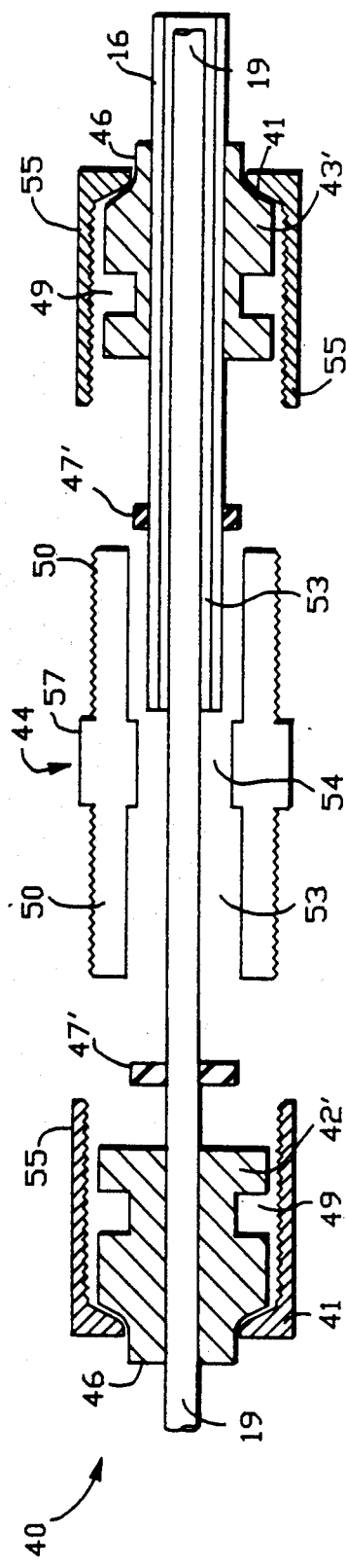
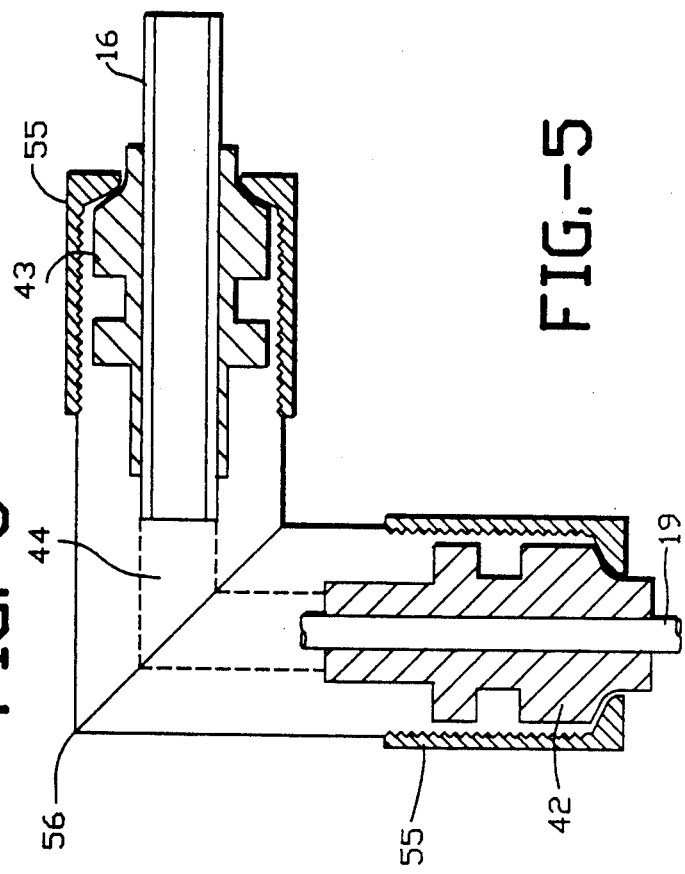
FIG.-6
FIG.-5

UNIVERSAL FITTING FOR METAL DISINTEGRATION ELECTRODES

FIELD OF THE INVENTION

The present invention relates to electric arc metal disintegrator apparatus. More particularly, the invention relates to a universal fitting for the connection of electrodes for use in a metal disintegrator.

The invention finds special application for joining a very short electrode to a longer electrode to form an electrode of suitable length for the workpiece. Electrodes may also be joined at right angles when offset work is necessary. The universal fitting protects electrodes by permitting a short section of a small diameter electrode to be exposed to the workpiece while the remaining length of the small electrode is carried within a larger diameter electrode. More particularly, the present invention relates to a universal fitting formed with a few standardized parts and which may be assembled and used in a variety of configurations.

BACKGROUND OF THE INVENTION

Metal disintegrators are used to remove broken taps, drill bits, and the like from pieces of bulk metal in which they have broken off and are embedded. The metal disintegrators operate by charging a hollow, tubular electrode to, for example, approximately 28 volts dc with the electrode positioned coaxial with and just above the embedded metal. The electrode is then vibrated longitudinally so as to repeatedly make and break contact with the embedded metal. The voltage potential with respect to the embedded metal varies which causes current to flow during contact, which in turn, causes localized heating to occur. The continued vibration causes a break in contact which causes an arc to flow from the electrode to the embedded metal, with substantial increases in temperature. Generally, the rate of vibration will be approximately 50 or 60 Hz. A stream of liquid coolant, such as water having a small amount of oil intermixed therewith, is propelled under pressure through a longitudinal passage in the electrode and onto the embedded metal. The liquid coolant creates thermal shock, causing fractures and metal disintegration. As the metal disintegrates and is converted into a powder, the liquid washes away the disintegrated powdered metal.

The hollow, tubular electrodes used in metal disintegrators are typically made from copper, graphite, tungsten, brass, molybdenum or alloys thereof. The electrodes generally are available in lengths of approximately 3 inches to 36 inches, and outer diameters of approximately 0.040 inches to 0.312 inches. The spark or discharge end of the electrode is consumed during the disintegration process. The consumable electrode may be attached at one end to the metal disintegrator by a quill or similar device extending longitudinally from the disintegrator head.

Selection of the electrode material and size depends upon the nature of the workpiece. It may be necessary for the electrode to be inserted into a narrow opening, or offset from the quill in order to reach the embedded material. Larger diameter electrodes, diameters greater than 0.312 up to 1.000 inches, may be necessary for special work. Special conditions, such as the need for a large diameter electrode and/or an offset workpiece, require the metal disintegrator operator to custom build, or to stock, specialized quills and/or connecting devices.

Smaller diameter electrodes, molybdenum electrodes for example, are delicate and easily broken if accidentally bumped or struck against the workpiece. The vibration produced by the disintegration process inherently contributes to the possibility of contact between the electrode and portions of either the workpiece or any objects found in the immediate environment thereby increasing the possibility of breakage of the electrode. Additionally, vibrations create "whip" at the tip of longer electrodes and thereby increase the possibility of contact between the electrode tip and the workpiece.

A significant problem with the electrodes of the prior art is that of bending, splitting and breakage. Certain electrodes, such as molybdenum electrodes, may be small in diameter and very expensive. The quill typically secures only one end of the electrode and the remaining length is unprotected during operation. Breakage is common and the shorter, broken-off lengths are frequently unusable for the next workpiece. Additionally, breakage interrupts the disintegration process while the operator changes electrodes. The proper length of the desired electrode may be unavailable. Metal disintegrator operators typically end up with a box of expensive, unusable electrode pieces and custom-constructed offset electrodes for special conditions.

Attempts have been made to join shorter electrode lengths to reduce waste in the industry. Solder has been used and glues, such as epoxy, have been tried to join smaller molybdenum electrodes. Solder and glue are less than successful and the result is often a weakened electrode. It is also time consuming to solder or glue electrode pieces together and such repairs may also result in an acid or resin residue which, if contact is made with a highly ground workpiece, may produce oxidation and resultant damage to the workpiece.

Offset workpieces have required the custom construction of electrodes using solder or epoxy, a process that is time consuming and expensive.

As can be seen from the above discussion of the prior art, an unsolved need exists in the field of metal disintegration for a universal fitting for connecting electrodes of short lengths and of any diameter, for protecting the electrodes, and for permitting electrode lengths to be easily joined together for both routine and offset work.

SUMMARY OF THE INVENTION WITH OBJECTS

A general object of the present invention is to provide a low cost universal fitting for electrodes that overcomes the limitations, drawbacks and disadvantages in the prior art.

A specific object of the invention is to provide a universal fitting for electrodes for use in metal disintegrators, the universal fitting components having standardized specifications for use with all metal disintegration electrodes and associated equipment.

Another specific object of the invention is to provide a universal fitting for electrodes for metal disintegrators that enables two electrodes to be joined together without the use of solder, glues or the like.

Yet another specific object of the invention is to provide a universal fitting for electrodes that enables electrodes as short as one inch in length to be used in metal disintegrators thereby facilitating effective use of heretofore "unusable" electrode lengths.

Still another specific object of the invention is to provide a universal fitting for electrodes that reduces "whip" at the operative end of the electrode thereby reducing breakage.

Yet one more specific object of the invention is to provide a universal fitting for an electrode that reduces breakage of electrodes by enabling only a short section of a small diameter electrode to be exposed while carrying the remaining length of the small diameter electrode within a larger diameter electrode.

Still another specific object of the invention is to provide a universal fitting that will enable electrodes to be easily joined for offset work.

In accordance with the present invention, a universal fitting is provided for joining two electrodes. In one aspect, the universal fitting includes the following component parts: at least two collets; at least two resilient seals; a tubular, hollow middle connector having external threads; and at least two internally threaded nuts. To join two electrodes in axial alignment, a first electrode having an attached seal is held by a first collet, the middle connector is provided, and, a second electrode having an attached seal is held by a second collet. The axially aligned components interconnect and are held together by the nuts, one nut being attached over each electrode at the collet end of the universal fitting and advanced over the collet to attach to the external threads on the middle connector. Tightening of the nuts causes the collets to grasp the electrodes and also causes compression of the seals to form a water-tight universal electrode fitting. The non-grasping end of each collet defines a shank portion for engagement with the hollow middle connector. The collets may be apertured to accommodate any diameter of metal disintegration electrode, and a smaller diameter electrode may be inserted completely through the middle connector and held within a larger diameter electrode attached to the opposite end of the middle connector by a second collet.

In a second aspect of the present invention, the middle connector defines generally a right angle which enables the metal disintegrator to be used at an angle to the workpiece for offset work. The electrodes are held within the legs of the right angle middle connector and do not interconnect.

The components of the universal fitting are apertured and sized to accommodate virtually all electrode diameters utilized in metal disintegrators. The electrodes may also be pre-fitted and stored with attached collets if desired. Additionally, a collet and nut of the present invention may be used to attach an electrode to the quill of the metal disintegrator apparatus.

In a third aspect of the present invention, the non-grasping end of each collet does not define a shank. Each collet adjoins the middle connector with the seals attached to the electrodes and interposed between the collet and middle connector. Tightening of the nuts over the components of the universal fitting creates a water tight seal between the components. The right angle middle connector may also be used in conjunction within the third aspect of the present invention.

These and other objects, aspects, advantages and features of the present invention will be more fully understood and appreciated upon consideration of the following detailed description of the preferred embodiment, presented in conjunction with the accompanying drawings.

BRIEF DESCRIPTION OF THE DRAWINGS

In the drawings:

FIG. 5 is a sectional view of a second embodiment of the present invention for the offset joining of electrodes.

FIG. 6 is an exploded view of a third embodiment of the present invention showing side sectional views of the collets and seals with attached electrodes.

DESCRIPTION OF A PREFERRED EMBODIMENT

Figure 1:
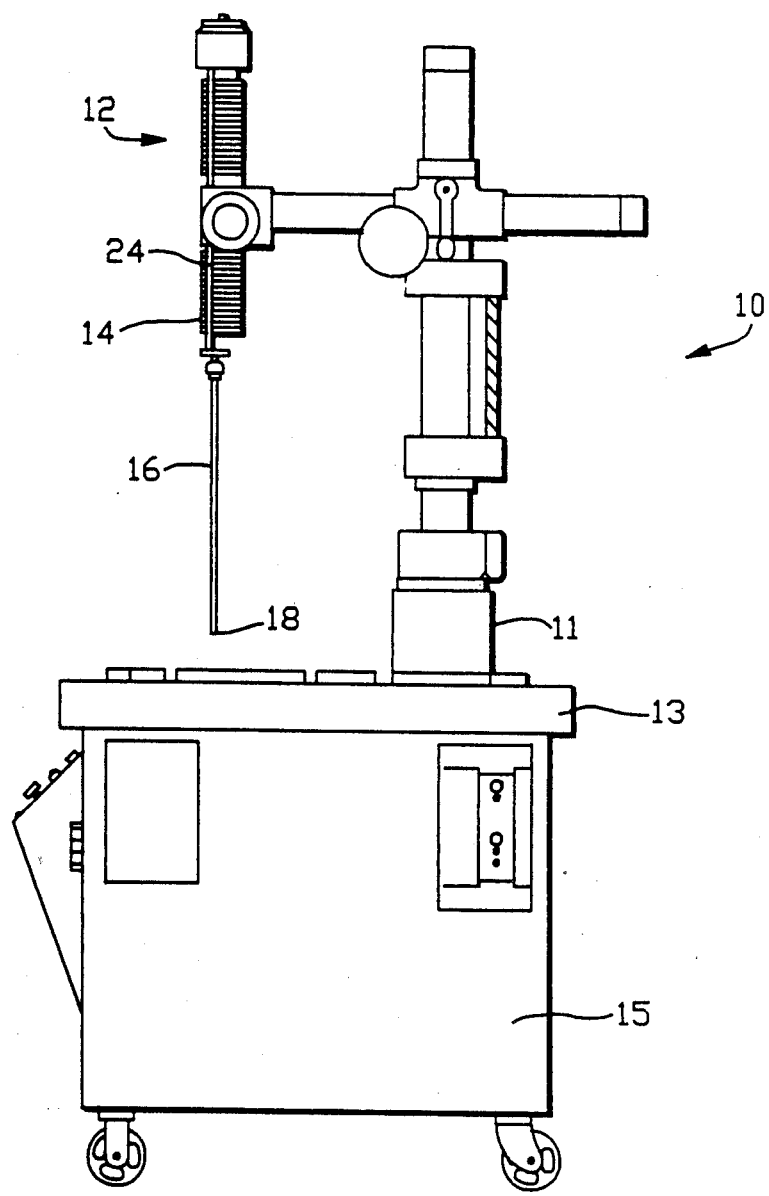
FIG. 1 shows a conventional metal disintegrator with an attached electrode.
Figure 2:
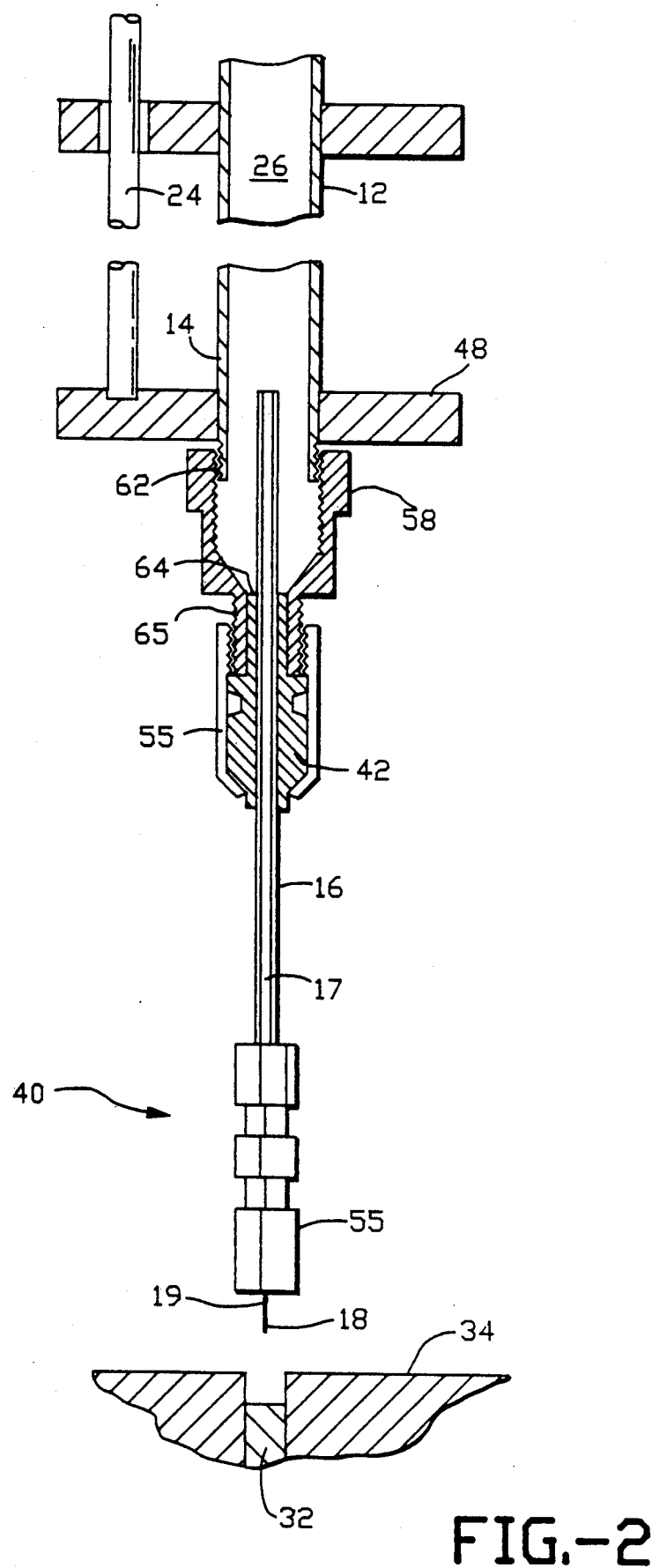
FIG. 2 shows a plan view of a universal fitting of the present invention. An electrode is shown attached to the quill area of the metal disintegrator by a collet of the present invention (in section), and the electrode is also shown joined to a second electrode by the present invention and poised for use over a workpiece.

With reference to FIG. 1, an electric arc metal disintegrator apparatus is shown generally at 10. A longitudinally extending quill 12 has one end 14 adapted to hold a longitudinally extending electrode 16, the electrode having a discharge end 18. Base 11 is electro magnetic and may be mounted to table 13 and cabinet 15 as shown, or may be moved to a remote site and mounted on any other suitable surface. Referring now to FIG. 2, electrode 16 is hollow and defines a longitudinally extending passage 17 through which flows cooling liquid from a coolant liquid source (not shown).

An interior space 26 of the quill 12 and the internal fluid passage 17 in the electrode permit the delivery of a stream of pressurized liquid coolant generally parallel to the electrode 16 and against a broken piece of metal 32, for example, a broken-off drill bit or the like, embedded in a metallic member 34.

The electrode 16 is generally kept at a desired dc or ac potential, for example at about 28 volts, through connection to a conventional power source, here shown as a component of cabinet 15. Vibrator rod 24 is vibrated longitudinally, thus alternately bringing discharge end 18 of the electrode 16 close enough to the broken-off piece of metal 32 to cause sparking, and moving the electrode far enough away from the broken piece of metal 32 so that sparking does not occur. Generally, the frequency of vibration will be about 50 to 60 Hz. As a liquid stream flows out of the electrode 16, it impinges upon the broken piece of metal 32 and sweeps away debris caused by the sparking from the discharge end 18 of the electrode 16 to the broken piece of metal 32.

An outwardly extending, radial flange 48 may be sealingly attached to the quill 12 adjacent the one end 14. Radial flange 48 prevents liquid coolant from splashing upwardly. As the vibrator rod 24 oscillates longitudinally, it causes the radial flange 48 to which it is threadably attached, to oscillate longitudinally, which in turn causes the electrode 16 to vibrate longitudinally. A conventional square nut housing 58 is attached to external threads 62 of quill 12. A collet 42 of the present invention is secured within the opening 64 of the threaded end 65 of square nut housing 58. Nut 55 of the present invention is added to secure collet 42 to square nut housing 58, and in turn, to quill 12.

A first preferred form for the universal fitting of the present invention is the fitting 40, shown connecting a small diameter electrode 19 at discharge end 18, for example a molybdenum electrode, to the larger diameter electrode 16. The electrode 16 is in turn attached to collet 42. The smaller electrode 19 may be as short as one inch in length, or longer, in which case it extends upwardly into internal passage 17 of larger electrode 16.

Figure 3:
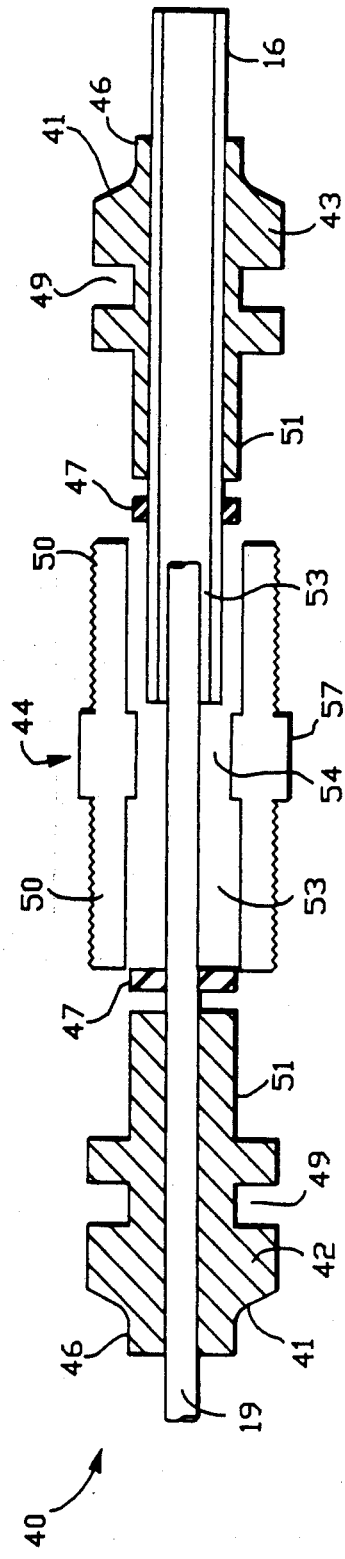
FIG. 3 is an exploded, side sectional view of the preferred embodiment of the universal fitting of the present invention.
Figure 4:
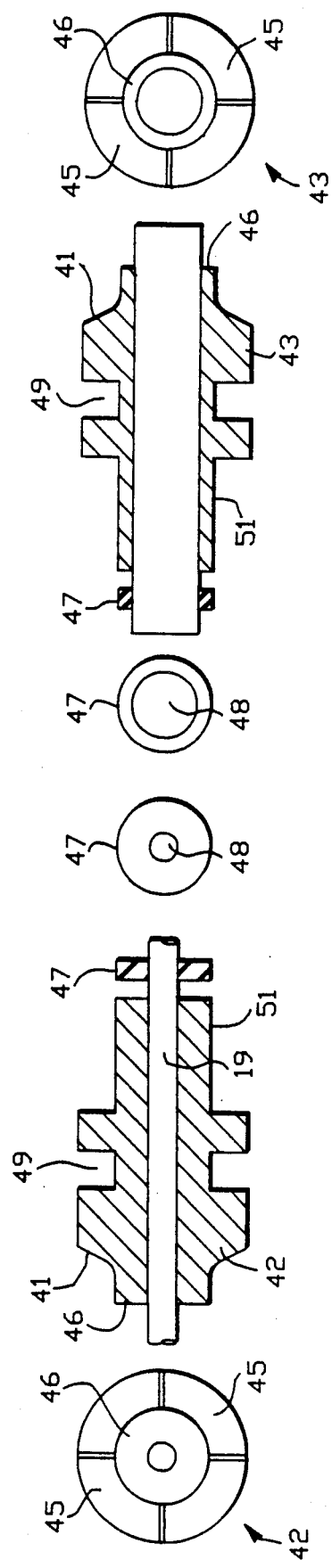
FIG. 4 is a further exploded view of the universal fitting of the preferred embodiment of the present invention showing end views of the collets and seals and side sectional views of the collets and seals with attached electrodes.

Referring now to FIGS. 3 and 4, the component parts of the universal fitting 40 are shown in section and in exploded and end views. Two collets, 42 and 43 are shown respectively at left and right ends of middle connector 44 in FIG. 3. Collets 42 and 43 are cylindrical, have generally frustoconical sides 41 which are parted by longitudinal slits to define four jaws 45 for securing the electrodes 16 and 19 to the collets 42 and 43. Collets 42 and 43 each define a cylindrical slot 49 which surrounds the cylindrical, barrel portion of the collet. Collets 42 and 43 also define outwardly extending, cylindrical flanges 46 at the grasping, frustoconical end of the collets. The flanges 46 reduce electrode "whip." Collets 42 and 43 further define a shank 51 at the non-grasping end of each collet 42 and 43. All shanks 51 of all collets of the present invention are of uniform, standardized diameter and length, i.e. approximately ⅛ inch in length and approximately ¼ inch in diameter, to permit the shank 51 to fit within conventional collets, square nuts and other attachment devices used to secure electrodes to metal disintegration equipment. All collets 42 and 43 of the present invention are approximately one inch in total length and may be machined to create apertures of any desired diameter to accommodate any of the electrode diameters used in metal disintegration.

Two resilient and flexible seals 47, such as rubber seals, are placed over both electrodes 19 and 16. Seals 47 are compressed and form a water-tight seal when the universal fitting 40 is completely assembled. Seals 47 are of a standardized outer diameter and are apertured according to the diameters of electrodes 19 and 16, respectively.

Connector 44 defines exterior threads 50 at both ends, and both ends of connector 44 further define bores 53 that communicate at a central region 54 of connector 44. The diameter of bores 53 is sized to permit shanks 51 to fit within bores 53. As shown in FIG. 4, communicating bores 53 permit a smaller electrode 19 to be passed through central region 54 and held within larger electrode 16 for protection of smaller electrode 19. The tubular, middle connector has a centrally placed flange 57 to permit the operator to grasp the connector for assembly and disassembly of the universal fitting.

Two internally threaded retainer nuts 55 are provided to slide over electrodes 19 and 16 and connect to threaded connector ends 50, as shown in FIGS. 1, 2, 5 and 6. Tightening retainer nuts 55 causes jaws 45 of collets 42 and 43 to grasp electrodes 19 and 16, respectively, and further causes compression of seals 47 to form a water-tight universal connector.

A second embodiment of the present invention is shown in FIG. 5. Connector 44 is L-shaped to permit electrodes 19 and 16 to be joined for offset work. In the second embodiment, the middle portion of the middle connector 44 is suitable joined at line 56, as by soldering.

A third embodiment of the present invention is shown in FIG. 6. Collets 42' and 43' do not define shanks, and seals 47' are apertured to correspond in diameter with, and to fit over, electrodes 19 and 16, respectively. When retainer nuts 55 are attached to threads 50, the non-grasping ends of collets 42' and 43' are forced against the ends of the middle connector 44, with the resilient seals 47' interposed.

Although three embodiments of the present invention have been disclosed herein, it is contemplated that various modifications of the invention will become apparent to those skilled in the art after having read the foregoing description. For example, the universal holder may be used with any metal disintegration apparatus and with any conventional style of collet, with or without a projecting flange, containing any number of grasping jaws. The collets may be drilled to accommodate any size of electrode used in metal disintegration. The standardized seals may also be apertured to fit over any size of electrode used in metal disintegration. Other gripping devices may be substituted for the hex nut on the connector and other designs for the connector section may be provided for special offset work. Accordingly, it is intended that the description not be considered limiting, and that the appended claims be interpreted to cover all alterations and modifications thereof which fall within the true spirit and scope of the invention.

I claim:

1. A fitting for joining two shafts, comprising:
   a connector having first and second ends, the first end having a bore extending part way toward the second end, and the second end having a bore extending toward and in communication with the first bore;
   first and second collet means adapted to fit over a first and a second shaft, respectively;
   first and second seals adapted to fit between the first and second collet means and first and second ends, respectively; and
   first and second retainer means affixed to the first and second ends of the connector for clamping the collet means over the respective shafts and forcing the respective collet means against the associated seal to form a water tight connection between the collet means and the respective ends of the connector.

2. The fitting set forth in claim 1 wherein the connector further comprises connecting means for attachment of the first and second retainer means.

3. The fitting set forth in claim 2 wherein the connecting means comprises external threads on the first and second ends of the connector.

4. The fitting set forth in claim 2 wherein the first and second seals are rubber seals having apertures.

5. The fitting set forth in claim 2 wherein the first and second collet means further comprise axially extending flange means at clamping ends thereof.

6. The fitting set forth in claim 2 wherein the first and second collet means are collets having longitudinal apertures therethrough, the apertures of a diameter sufficient to permit passage of the first and second shafts therethrough, respectively, the first and second collets each further defining a frustoconical clamping end and an opposite end.

7. The fitting set forth in claim 6 wherein the opposite ends each define a shank for connection within the first and second end bores, respectively.

8. The fitting set forth in claim 7 wherein the first and second collets are approximately one inch in length, the first and second shanks are ¼ inch in diameter and ½ inch in length, and the first and second end bore diameters are ⅜ inch.

9. The fitting set forth in claim 7 wherein the frustoconical clamping end of the first and second collets further defines an axially extending flange.

10. The fitting set forth in claim 3 wherein the connector further comprises gripping means for holding the connector while attaching the first and second retainer means.

11. The fitting set forth in claim 7 wherein the first and second retainer means are conventional hex nuts having internal threads for attachment over the first and second collets and to the external threads on the first and second ends of the connector.

12. The fitting set forth in claim 8 wherein the first and the second shafts are electrodes are at least one inch in length.

13. The fitting set forth in claim 7 wherein the diameter of the first shaft is smaller than the diameter of the second shaft, the first shaft capable of sliding within the second shaft.

14. The fitting set forth in claim 12 wherein the first and second shafts are hollow, metal disintegration electrodes.

15. The fitting set forth in claim 9 wherein the first and second ends of the connector are axially aligned.

16. The fitting set forth in claim 2 wherein the first and second ends are at right angles with respect to each other.

17. The fitting set forth in claim 16 wherein the connecting means comprises external threads on the first and second ends of the connector.

18. The fitting set forth in claim 17 wherein the first and second seals are rubber seals having apertures.

19. The fitting set forth in claim 17 wherein the first and second collet means are collets having longitudinal apertures therethrough, the apertures of a diameter sufficient to permit passage of the first and second shafts therethrough, respectively, the first and second collets each further defining a frustoconical clamping end and an opposite end.

20. The fitting set forth in claim 19 wherein the opposite ends each define a shank for connection within the first and second end bores, respectively.

21. The fitting set forth in claim 20 wherein the first and second collets are approximately one inch in length, the first and second shanks are ¼ inch in diameter and ½ inch in length, and the first and second end bore diameters are ⅜ inch.

22. The fitting set forth in claim 20 wherein the frustoconical clamping end of the first and second collets further defines an axially extending flange.

23. The fitting set forth in claim 20 wherein the first and second retainer means are conventional hex nuts having internal threads for attachment over the first and second collets and to the external threads on the first and second ends of the connector.

24. The fitting set forth in claim 20 wherein the first and the second shafts are electrodes at least one inch in length.

25. The fitting set forth in claim 23 wherein the first and second shafts are hollow, metal disintegration electrodes.

26. The fitting set forth in claim 3 wherein the first and second seals are rubber seals having apertures adapted to fit over the first and the second shafts, respectively.

27. The fitting set forth in claim 26 wherein the first and second collet means further comprise axially extending flange means at clamping ends thereof.

28. The fitting set forth in claim 26 wherein the first and second collet means are collets having longitudinal apertures therethrough, the apertures of a diameter sufficient to permit passage of the first and second shafts therethrough, respectively, the first and second collets each further defining a frustoconical clamping end and an opposite end.

29. The fitting set forth in claim 28 wherein the frustoconical clamping end of the first and second collets further defines an axially extending flange.

30. The fitting set forth in claim 28 wherein the connector further comprises gripping means for holding the connector while attaching the first and second retainer means.

31. The fitting set forth in claim 28 wherein the first and second retainer means are conventional hex nuts having internal threads for attachment over the first and second collets and to the external threads on the first and second ends of the connector.

32. The fitting set forth in claim 31 wherein the diameter of the first shaft is smaller than the diameter of the second shaft, the first shaft capable of sliding within the second shaft.

33. The fitting set forth in claim 31 wherein the first and second shafts are hollow, metal disintegration electrodes.

34. The fitting set forth in claim 33 wherein the first and second ends of the connector are axially aligned.

35. The fitting set forth in claim 33 wherein the first and second ends are at right angles with respect to each other.

36. A holder for joining plural electrodes, comprising:
- a tubular connector body having first and second ends and a longitudinal bore extending throughout a central region therebetween, the first and second ends defining external threads, the central region further defining an external hex section disposed between the external threads of the first and the second ends;
- two seals for forming water-tight connections at the first and second ends of the connector body, the seals defining central apertures, respectively;
- two collet means for slidably grasping an electrode at a frustoconical grasping end thereof, each collet means further defining an axially disposed flange at the tapered grasping end, each collet means further having an opposite end and a longitudinal aperture extending from the grasping end and through the opposite end, each longitudinal aperture of a diameter sufficient to permit passage of the corresponding electrode; and
- two nuts for sealably joining the collet means and the connector body, the nuts sliding over the electrodes at each end of the connector body and attaching to the external threads of the first and second ends.

37. A holder for joining plural electrodes, comprising:
- a tubular connector body having first and second ends and a longitudinal bore extending throughout a central region therebetween, the first and second ends defining external threads, the central region further defining an external hex section disposed between the external threads of the first and the second ends;
- two seals for forming water-tight connections at the first and second ends of the connector body, the seals defining central apertures, respectively;
- two collet means for slidably grasping an electrode at a tapered grasping end thereof, each collet means further defining an axially disposed flange at the tapered grasping end, each collet means further having an opposite end defining a shank and a longitudinal aperture extending from the grasping end and through the shank, each longitudinal aperture of a diameter sufficient to permit passage of the corresponding electrode, the shanks for engagement within the first and second bores, respectively; and
- two nuts for sealably joining the collets and the connector, the nuts sliding over the electrodes at each end of the connector and attaching to the external threads of the first and second ends.

38. A holder means for holding an electrode for use with a metal disintegrator, comprising a collet means, a seal, and a retainer means, the collet means comprising:
- a grasping end and an opposite end, the grasping end tapered and adapted to grasp the electrode, the opposite end defining a shank for engagement within the metal disintegrator;
- a longitudinal passage extending from the grasping end and through the opposite end of the collet means, the passage adaptable to accommodate the electrode utilized with a metal disintegrator;
- a seal for forming a water tight connection between the collet means and the metal disintegrator, the seal slidably attaching over the electrode;
- a retainer means for clamping the collet means over the electrode and for securing the collet means to the metal disintegrator, the retainer means further causing compression of the seal to form a water tight connection between the collet means and the metal disintegrator.

39. The holder means set forth in claim 38 wherein the grasping end of the collet means further comprises an flange axially extending from the tapered, grasping end.

40. The holder means set forth in claim 38 wherein the shank of the collet means is approximately ¼ inch in diameter and ½ inch in length, the diameter of the longitudinal passage is approximately 0.02 inches to 1.00 inches, and the length of the collet means is approximately one inch.

41. The holder means set forth in claim 39 wherein the shank of the collet means is approximately ¼ inch in diameter and ½ inch in length, the diameter of the longitudinal passage is approximately 0.02 inches to 1.00 inches, and the length of the collet means is approximately one inch.

42. A method for joining two electrodes, comprising:
- slidably connecting a first and a second collet over a first and a second electrode, respectively;
- slidably connecting first and second seals over the first and second electrodes, respectively at a non-grasping end of the first and the second collet, respectively;
- joining the first and second ends to first and second ends of a hollow middle connector;
- placing first and second retainer nuts over the first and second collets and connecting the retainer nuts to the first and second ends of the middle connector; and
- tightening the retainer nuts to cause the collets to grasp the electrodes and to cause compression of the seals to form a water-tight connection between the collets and the middle connector.

* * * * *